(12) United States Patent
Klementiev et al.

(10) Patent No.: US 7,395,456 B2
(45) Date of Patent: Jul. 1, 2008

(54) QUERY-BASED IDENTIFICATION OF USER INTERFACE ELEMENTS

(75) Inventors: Dmitri A. Klementiev, Redmond, WA (US); Howard Brian Herdeg, III, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 11/207,120

(22) Filed: Aug. 17, 2005

(65) Prior Publication Data

US 2007/0043701 A1   Feb. 22, 2007

(51) Int. Cl.
*G06F 11/00* (2006.01)
(52) U.S. Cl. ............................. 714/38; 717/124; 715/853
(58) Field of Classification Search .................. 717/124; 714/38; 707/3
See application file for complete search history.

(56) References Cited

U.S. PATENT DOCUMENTS

| | | | |
|---|---|---|---|
| 5,781,720 A * | 7/1998 | Parker et al. | 714/38 |
| 6,360,268 B1 * | 3/2002 | Silva et al. | 709/227 |
| 6,948,152 B2 * | 9/2005 | Dubovsky | 717/124 |
| 6,961,873 B2 * | 11/2005 | Dubovsky | 714/38 |
| 2005/0172270 A1 * | 8/2005 | Dathathraya et al. | 717/124 |
| 2005/0246326 A1 * | 11/2005 | McKeon | 707/3 |

OTHER PUBLICATIONS

Logical Operators and Aggregation, http://db.grussell.org/sql2.html, Apr. 7, 2004, pp. 1-4.*
Implementing a Microsoft Active Accessibility (MSAA) Server, Mozilla.org, Sep. 24, 2004, pp. 1-4.*

* cited by examiner

*Primary Examiner*—John Cottingham
*Assistant Examiner*—Sherief Badawi
(74) *Attorney, Agent, or Firm*—Workman Nydegger

(57) ABSTRACT

Described is the use of query identifiers that provide computer users a method of "bookmarking" (uniquely identifying) any user interface (UI) element in any UI framework. This is useful for testing programs, assistive technologies, and teaching activities. The unique query element identifier is identified for a target UI element to locate within a hierarchy of UI elements. For example, the element's Name, ClassName, Instance, AccessibleName, Role, ControlId and AutomationId may be used to develop the unique query element identifier. From the query elements in the hierarchy of UI elements, a query identifier is generated for the target UI element. The query identifier includes the query element identifier and possibly ancestor query element identifiers, with each ancestor query element identifier corresponding to a higher-level ancestor element relative to the target element in the hierarchy. The query identifier may be used to locate the target element for testing versions of application programs.

14 Claims, 6 Drawing Sheets

| | |
|---|---|
| ⊞ Accessible | |
| ChildId | 0 |
| CentralId | 0 |
| MSAAClassName | Notepad |
| MSAAName | File |
| MSAAQueryId | :Name = 'temp.txt - Notepad' && ClassName = 'Notepad':Name = 'Appli... |
| MSAAShortQueryId | :Name = 'temp.txt - Notepad' && ClassName = 'Notepad':Name = 'Appli... |
| Role | menu item |
| ⊞ Misc | |
| Coordinates | 429,5 |
| ⊞ LoadedModules | String[]Array |
| PerfElementFromPaint | |
| ProcessName | notepad |
| Rectangle | 407,65,34,24 |
| Time | 11/23/2004 13:32:50 \| 50 483 |
| ⊞ Navigation | |
| ApplicationClass | Notepad |
| ApplicationName | temp.txt - Notepad |
| ParentClass | |
| ParentName | |
| ParentWindowMsaaName | temp.txt - Notepad |
| ⊞ Properties | |
| ActionName | Verify |
| AdditionalInfo | |
| KeyModofier | |
| Value | |

QUERY-BASED IDENTIFICATION OF USER INTERFACE ELEMENTS

BACKGROUND

The ability to record and playback UI interactions benefits many domains, including macro scripting for users of assistive technologies, training, and testing. A significant impediment to reliable recording and playback of UI interaction has been uniquely identifying each UI component in a reliable and performant manner.

In the test domain, thoroughly testing computer programs is very expensive for development enterprises. As a result, some form of automated testing is typically used to save expense, and indeed, often can more consistently test the program than can a large number of independent testers. One type of testing framework is record and playback, in which a tester interacts with a program, with some or all of the user input (e.g., keystrokes and other input such as mouse events) recorded. By recording the input, the same input can be applied to the user interface elements in other versions of the program in a playback operation, whereby the same test can be reused multiple times to find bugs and other problem areas that resulting following a version change.

A first step in automated testing is finding a user interface (UI element) to test. In some cases, this is as simple as finding the running application by its executable filename, and a ControlId for the element. However, especially with multiple frameworks, finding the element is rarely this simple.

For example, many different types of UI-based applications have been deployed, and while the basic concepts of each are similar, their actual implementations are different. In particular, a mandatory property for one application is often optional for another. Further, in the course of adding value, some of the properties that are supposed to be mandatory may have been missed. As a result, in most programs, no single set of properties can be used to uniquely identify all controls.

By way of example, consider a Win32 control such as a button that has an associated ControlId. This ControlId may have been originally intended to be unique to the program, that is, there should be only one control with this value associated with it inside the executable program. However, with large projects that build upon other components, the desired uniqueness intention quickly becomes unmanageable, and is rarely enforced.

SUMMARY

Briefly, various aspects of the present invention are directed towards the use of query identifiers that provide testers with a powerful and flexible way to specify user interface elements. A unique query element identifier is identified for a target user interface element to test within a hierarchy of user interface elements. For example, the element's Name, ClassName, Instance, AccessibleName, Role, ControlId and AutomationId may be used to develop the unique query element identifier, from the query elements in the hierarchy of user interface elements. The query identifier includes the query element identifier therein and zero or more ancestor query element identifiers, with each ancestor query element identifier corresponding to a higher-level ancestor element relative to the target element in the hierarchy.

The query identifier may be used to locate the target element for testing a first application program, and to search for the target element for testing a second application program.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a representation of a details window that is used when developing a test using query identifiers.

DETAILED DESCRIPTION

Exemplary Operating Environment

Figure 1:
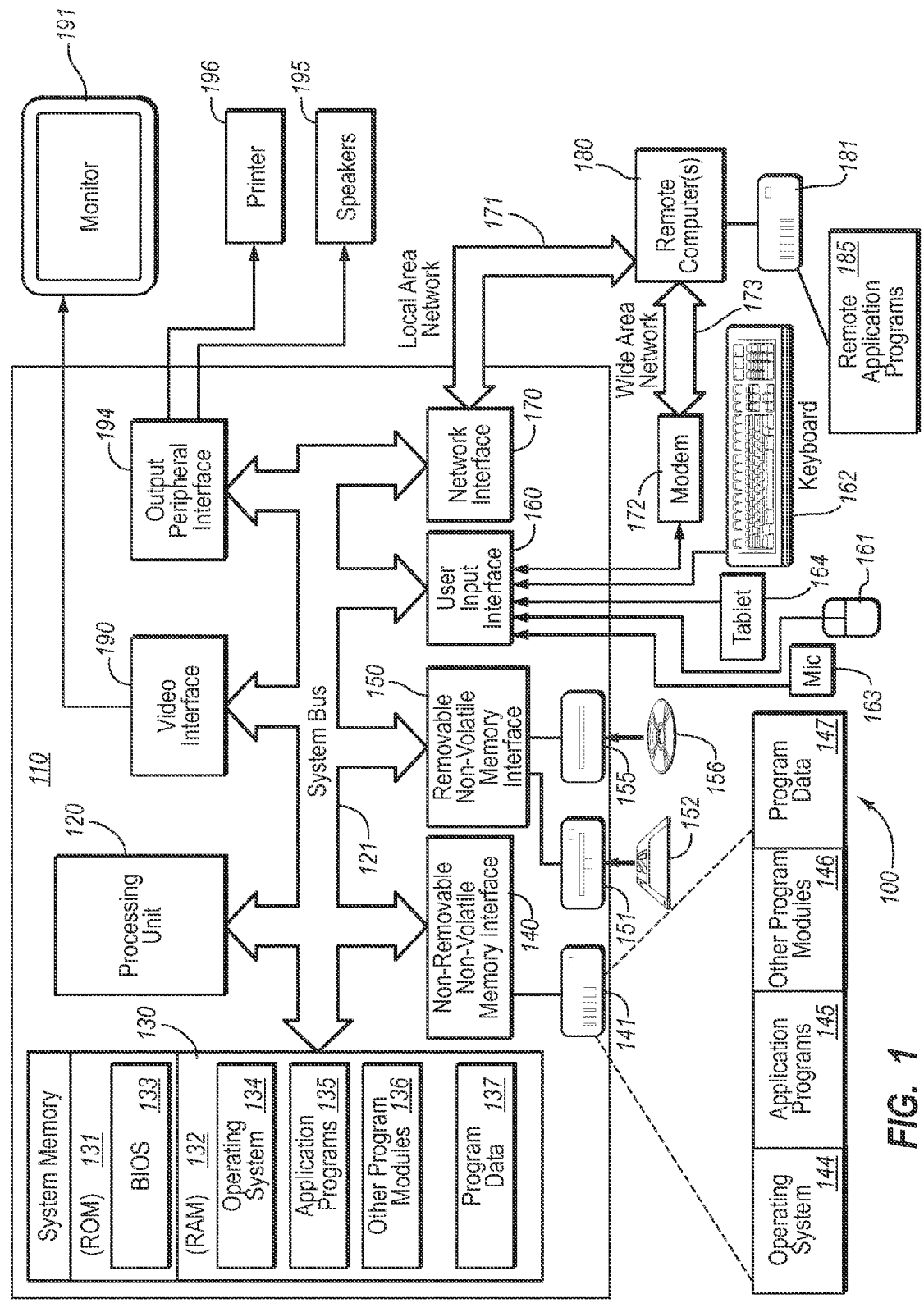
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Query Identifiers

Various aspects of the technology described herein are directed towards a uniquely identifying a user interface (UI) element based on its specific parameters and attributes, including its relationship to other UI elements. In one example implementation, these parameters may include the Name, ClassName, Instance, AccessibleName, Role, ControlId and AutomationId, while the relationships between the desired UI element and other UI elements may correspond to parent, sibling, child or the element's position in a sequence. Notwithstanding, there is no intention to limit the identification to these particular element parameters and/or attributes including relationships. As such, any of the examples mentioned herein are non-limiting, and the present invention may be used various ways that provide benefits and advantages in computing in general.

As will be understood, this flexible use of parameters and attributes to identify a UI element is like a path that can be used to traverse possibly many known elements to reach a desired sub-element, and somewhat resembles a database query language (e.g., like SQL, in contrast to a strongly typed interface). As a result, a suitable name for this structure and functionality is referred to herein as a query identifier, or QueryID. However, the use of the term "query" is not intended to limit the present invention to database-related technologies.

In general, it has not been possible to identify UI elements for assistive technology or automated testing without relying on either the element's position on the screen or the element's position in a hierarchy. These techniques have relatively low success rates that often break when the corresponding metric changes. For example, changes in location and/or screen resolution will break position-based identification systems. Changes in the software hierarchy of a control, e.g., moving a button from one dialog or other sub-element to another, will break solutions that are based on hierarchy.

The identification of UI elements in a record and playback framework follows the above-described concepts, wherein an identifier for each UI element may be referred to as a QueryElement, and the path is called QueryId (full or partial, as described below).

One mechanism for identifying UI elements described herein relies upon the specific parameters and attributes of a given UI element and its relationship to other UI elements to uniquely identify it; the result is a query-based identifier, or QueryElement. As described above, in one implementation, the following parameters for QueryElements may be supported for a query:

Name—name of a window, UI Element
ClassName—class name of a window, UI Element
Instance—instance of a window, UI Element
AccessibleName—MSAA name—(ignored if [MSAA] is present since the [MSAA] Name and AccessibleName are the same)
Role—MSAA role ControlId—ControlId of a UI element
AutomationId—Avalon Id, unique in its parent container
QueryElement Attributes [ ] (described below)
Framework Attributes [ ] (described below)

In general, a QueryElement is generated based on the information available for a particular UI element. For example, if an AutomationId is available, then it can be used to form a QueryElement for UIA playback:

"AutomationId='12298'"

Where an AutomationId is not supported (that is, in other frameworks), the following algorithm may be used, namely if a name and type (role in MSAA) are available, then they are used to form a QueryElement. A sample identifier is shown below, in which the logical AND (&&) symbol is used to logically join two or more identifiers into a QueryElement (other logical operators, e.g., OR and NOT also may be supported):

Name='Menu Bar' && ControlType='MenuBar'
(when UIAutomation is used)

or

Name='OK' && Role='push button' (when MSAA is used).

Note that the "equal" sign (=) is used for an exact match. For an inexact (partial) match (e.g., meaning that "Name contains . . . "), a different symbol such as an arrow (=>) may be used; this is particularly valuable when locating dynamically generated class names and the like. Further, Note that Queries should be unique; in no situation should two Queries have the same pair QueryElement pair (name, type) for siblings. If so, then ordinarily this is considered an accessibility bug, because it is not possible to distinguish between two different UI elements using Accessibility tools such as screen readers. This means that a QueryElement pair (name, type) should uniquely identify a UI element.

Continuing with the rules/algorithm for uniqueness, if type is not supported, then the class name is used, e.g.:

Name='OK' && ClassName='Button'

In a situation when information about name/type/class can not be retrieved, or this information does not uniquely identify a UI element, then an Instance can be used. For example, if a test needs to navigate to the first sibling with Name='ARPopUpMenuCtrl.ARPopUpMenu' && ControlType='ListItem' the following QueryElement is used, e.g.,:

"Name = 'ARPopUpMenuCtrl.ARPopUpMenu' && ControlType = 'ListItem' && Instance = 1"
or (in a different syntax)
"Name = 'ARPopUpMenuCtrl.ARPopUpMenu' && ControlType = 'ListItem' #1"

If a test needs to navigate to the second instance, e.g.:

"Name = 'ARPopUpMenuCtrl.ARPopUpMenu' && ControlType = 'ListItem' && Instance = 2"
or (in a different syntax)
"Name = 'ARPopUpMenuCtrl.ARPopUpMenu' && ControlType = 'ListItem' #2"

As described herein, a QueryId is an identifier path that is composed of QueryElements. Examples of different QueryIds using QueryElements are set forth below:

";Name = 'Microsoft Development Environment' && ClassName = 'wndclass_desked_gsk';Name = 'Choose Toolbox Items' && ClassName = '#32770';ClassName = '#32770';AutomationId = '5325; Name = 'ARPopUpMenuCtrl.ARPopUpMenu' && ControlType = 'ListItem' #1"
";Name = 'Untitled - Notepad' && ClassName = 'Notepad' ;Name = 'Font' && ClassName = '#32770';ElementId = '1136';ElementId = '1000';Name = 'Castellar' && ControlType = 'ListItem'"

Using examples with element parameters in various frameworks, a ControlId comprises a number often assigned to controls in Win32 applications, while a Resource ID comprises a number assigned to text strings in an application that has been localized. A Child ID is a variant that is a part of (IAccessible, ChildId) pair that identifies a UI Element in an MSAA environment. An AutomationId is a number or string which should be unique within its container on retained mode graphics element tree applications. An MSAA Name comprises a Name assigned to a control that supports MSAA, a Class Name comprises the class name assigned to a Win32, and an MSAA Role comprises the Role assigned to a control that supports MSAA.

Thus, while the ControlId may uniquely identify a particular UI element, the uniqueness of the ControlId exists only in the scope of the window in which this control belongs (its parent container). Previously, test programs and Accessible Technology programs which counted on unique ControlIds were broken when the same ControlId is assigned to more than one element. For example, many "Cancel" buttons often appear in the same program; also, dialogs have control ideas, while other things such as menus do not have ControlIDs.

To solve this problem, a "ControlId path" may be used. Consider four controls (A-D) which have been assigned four ControlIds (Id1-Id4). As shown, element D has Id Id4, and its ancestors are: C (=Id3), B (=Id2) and A (=Id1):

A (Id1)
B (Id2)
C (Id3)
D (Id4)

If Id4 is unique in this application, then a test program can search for Id4 only, and correctly determine which UI Element is associated with this Id (D):

QueryID=;Id4

However, if Id4 is not unique in the application, but is the only Id4 that has a parent with Id3, then this element can be uniquely defined as the UI Element with Id4 and a parent having Id3:

QID=;Id3;Id4

This concept of an Id Path can logically be extended to whatever level of detail is required, including the full representation:

QID=;Id1;Id2;Id3;Id4

QueryElements tell the record and playback framework what property to look for, and what value constitutes a match. In the example above, the property name was matched with 'Untitled-Notepad'—this is a QueryElement. As described above, some of the properties used for QueryElements include Name, ClassName, Instance, AccessibleName, Role, ControlId and AutomationId.

By way of example, consider the following:

Name = 'Untitled - Notepad'
ClassName = 'Notepad'
Role = 'menu bar'

Queries are built from QueryElements that describe a control. For example, the first query from the previous example is composed of two QueryElements; this query is only satisfied with the proper Name and ClassName:

;Name='Untitled-Notepad' &&
   ClassName='Notepad'

QueryIds contain one or more queries to uniquely identify a UI Element. Again, from the example above:

;Name = 'Untitled - Notepad' && ClassName =
'Notepad';Name = 'Application' && Role = 'menu bar';Name =
'File' && Role = 'menu item'

As described above, the first character of a QueryId defines the delimiter that will be used to separate the QueryId into multiple queries. The only requirement for a delimiter in a QueryId is that it should not be encountered in any of the queries that comprise a QueryId. In the example above, the first character was the semicolon, and thus this QueryId decomposed into the following three queries:

Query 1: ;Name ='Untitled - Notepad' && ClassName =
'Notepad'
Query 2: ;Name = 'Application' && Role = 'menu bar'
Query 3: ;Name = 'File' && Role = 'menu item'

Generally each query in a QueryId may represent the ID either for a window or for UI element. This is due to the fact that the record and playback framework is using combinations of search mechanisms: Win32, MSAA and UIAutomation. This technology allows the record and playback framework to navigate to a UI element supported by this technology.

Figure 2:
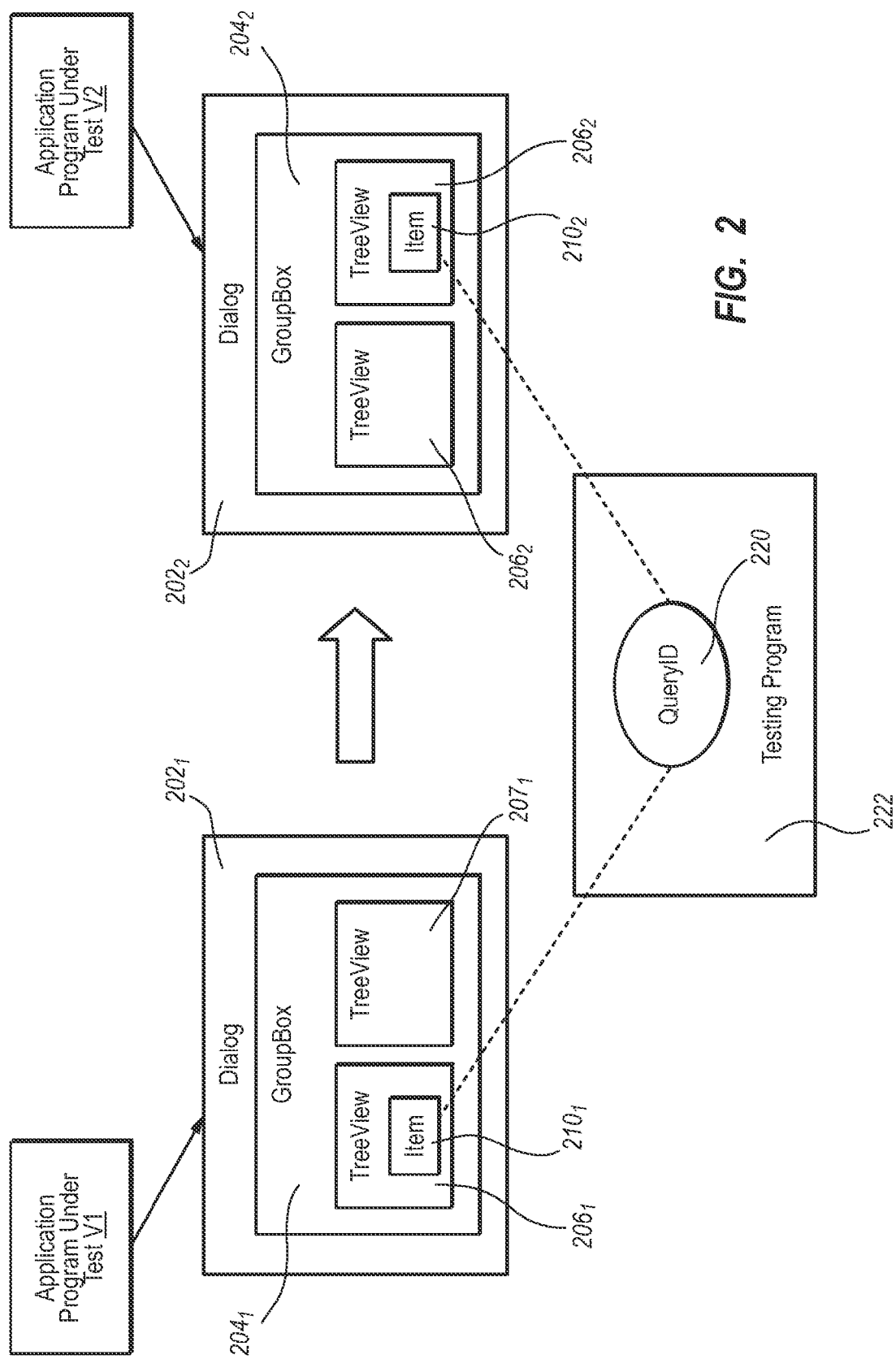
FIG. 2 is a block diagram representing an example usage of a query identifier in testing application program versions.

Turning to the general usage of a QueryID, FIG. 2 generally represents how a QueryID is advantageous over existing identification mechanisms. In FIG. 2, consider that in one version a dialog $202_1$ of an application program version V1 under test contains a GroupBox control $204_1$, which in turn contains two TreeView controls $206_1$ and $207_1$, a first of which, TreeView control $206_1$, contains an item $210_1$ such as a button outline item. In another application program version V2, the dialog box $202_2$ has been changed in that item $210_2$ has been moved to TreeView control $207_2$.

As will be understood, the test developer may specify a QueryID for the item, which remains consistent across versions from the perspective of a testing program 222, even though the item's hierarchical position in the dialog or other characteristics has changed between versions.

QueryIds are thus very flexible and use non-dynamic properties of a UI element to uniquely identify it. In this manner, a query-based identifier for a UI element provides a location-independent and resolution-independent identifier, and one that is also independent of a UI.

Moreover, as also mentioned above, a QueryId is similar to a path, and in many situations a QueryId will traverse many known elements to reach a desired sub-element. A QueryId is referred to herein as a full QueryId if the path contains all intermediate elements. A QueryId is referred to herein as a partial QueryId if not all intermediate elements show up in the path. For example, using the representation of FIG. 2, a full QueryId would comprise the query element identifiers for ";DialogID;GroupBoxID;TreeViewID;ItemID" (note that the first symbol in a QueryID is a delimiter that divides identifiers).

A partial QueryId, which the tester can specify for robustness, need only include the query element ItemID and/or any parents, and for example may comprise the ";DialogID; GroupBoxID;ItemID".

As can be readily appreciated, the full QueryId provides better performance, as an element can be quickly located in a hierarchy, but is less robust in that moving the element (e.g., the item 210 in FIG. 2) will cause it to be not located during playback. Conversely, the partial QueryId allows the element to be located (e.g., in a breadth-first search and thus has lesser performance characteristics) in a manner that is more robust, in that it will be found under either TreeView element. The test developer has the conscious option to determine how to trade off robustness versus performance.

Although various derivatives are possible, two primary scenarios use QueryIds for assigning to each UI element. A first scenario is when a client returns to a previously discovered UI element. For example, testing scripts, AT (Accessible Technology) products, and record/playback utilities may use the QueryId to store an opaque, unique identifier for a specific UI Element. The client uses that stored QueryId at some later time, e.g., during playback, to locate and retrieve that same UI element (provided the element is currently instantiated in the UI). In one example implementation described herein, a QueryId is a component of a Record and Playback Framework used for testing programs, and is built upon two accessible technology frameworks from Microsoft Corporation, namely MSAA (Microsoft Active Accessibility) and UIAutomation.

Another scenario is when a client scopes the search for an element by its QueryID, by specifying the starting element. In such a scenario, the client explicitly scopes its search to a particular application window to avoid finding multiple elements, such as when multiple instances of the target application program are running. In order for a search to succeed, the starting UI Element specified by the client needs to be an ancestor of the element identified in the specified QueryID.

Figure 3:
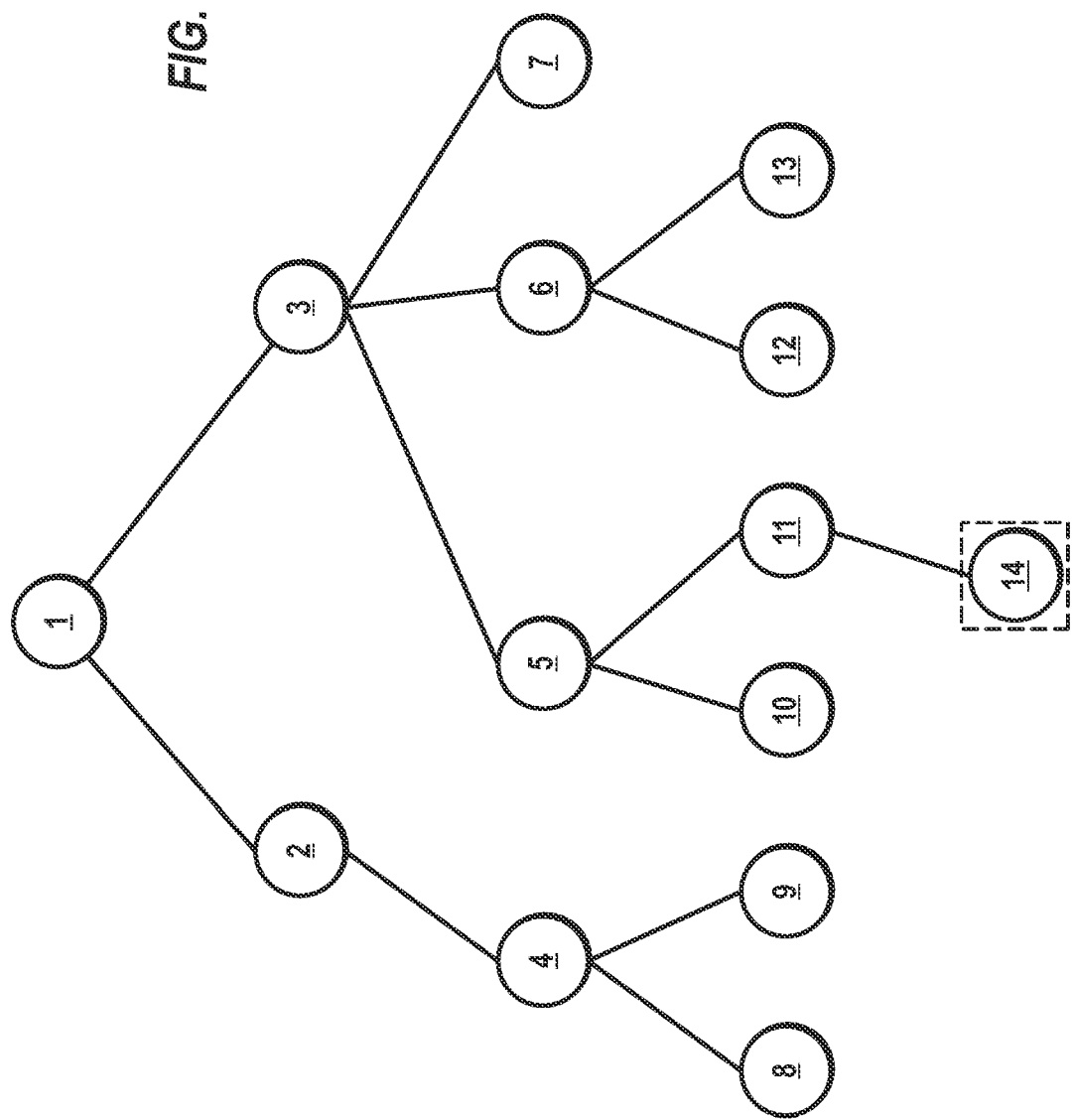
FIG. 3 is a representation of a hierarchy of user interface elements to demonstrate various ways of locating an element via query identifiers.

By way of another example using simple numbers for query elements, consider the hierarchy of FIG. 3, in which a test developer wants to test the element numbered 14, (as indicated by the dashed box surrounding it). For example, element 1 may represent the application window, elements 2 and 3 dialogs within the window, and so forth down to element 14. Note that element 0 is implicit, and represents the desktop. A full QueryID for query element 14 comprises the element identifiers for elements ";1;3;5;11;14". As can be readily appreciated, this is a direct path, but not robust, in that the element 14 may be moved in the hierarchy from one program version to another whereby the full QueryID for element 14 would become incorrect for the other version.

As can be readily appreciated, a more robust, but more difficult to locate partial QueryID may simply specify the element ";14". Because of the use of attributes, the identifier for element 14 is unique to the hierarchy, whereby a search (e.g., breadth first) will locate this element wherever it is located in the hierarchy. Other options the test developer has may include some parents to help locate the element, e.g., ";1;14" (identifiers 3, 5 and 11 are missing) or ";1;3;14" (identifiers 5 and 11 are missing). One or more intermediate parents may be skipped, e.g., ";5;14" (identifiers 1, 3 and 11 are missing).

Figure 4:
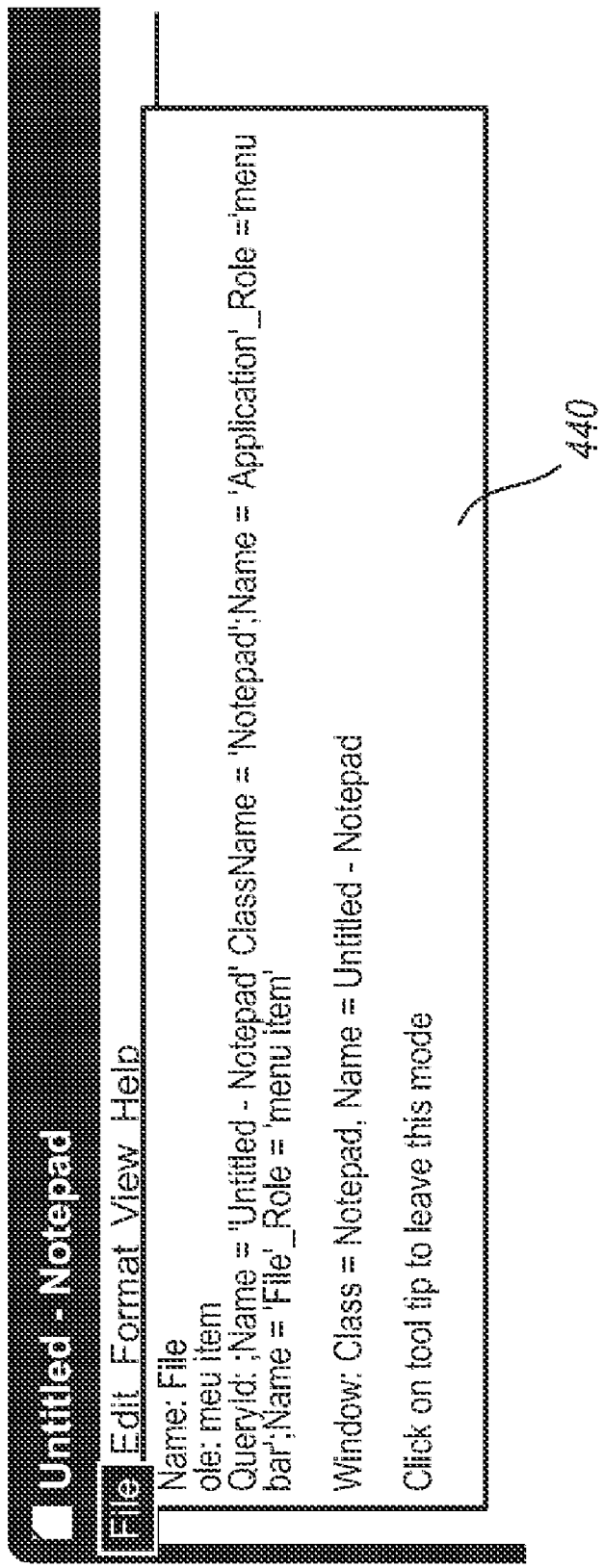
FIG. 4 is a partial screen-shot representation showing a tool tip that provides a query identifier for a user interface element.

Turning to consideration of determining and generating a QueryID, consider an example that allows access to the "File" menu on the well-known Microsoft® Notepad application program. In one implementation, a record and playback framework provides a tester with a built-in Inspector by selecting an appropriate icon or the like. Then, the tester identifies the UI element by hovering over it with the mouse, whereby a tool tip or the like may appear with the details. For example, FIG. 4 provides a representation 440 of a tool tip that appears after selecting the Inspector and hovering over the File menu on Notepad.

In this example, the third line in the tool tip 440 starts with QueryId: and continues:

---

;Name = 'Untitled - Notepad' && ClassName = 'Notepad';Name = 'Application' && Role = 'menu bar';Name = 'File' && Role = 'menu item'

---

Most of the time, this is all of the information that the tester needs, providing a QueryID that allows the record and playback framework to access this UI element. Rather than re-type the QueryID, the tester may click on the tool tip to close it, which saves a copy of the QueryID in a UI Elements window of the record and playback framework.

In the example above, clicking on the tool tip window to close it also adds the following entry in the UI Element window on the record and playback framework.

-File[menu item]

Clicking on this entry fills in a details window 550 below the UI Element window, as generally represented in FIG. 5. The tester can then transfer this query string into the clipboard, e.g., by right-clicking on a MsaaShortQueryId, choosing Select All, and then Copy to. Note that when the record and playback framework is recording, the record and playback framework will automatically generate the QueryID and place it in the generated source code. By default, in one implementation a QueryID may be generated as start point, immediate parent and target element, e.g., in FIG. 3, the QueryID may be generated as the path ";1;11;14" by default.

Essentially, when recording, the record and playback framework will, for example, catch a mouse click on a target element, and obtain the information about that target element to generate a target identifier for that element. The record and playback framework will then go to the parent, up to the top of the hierarchy, (e.g., the Hwnd of the top window for using a Win32 search to find at least the window). Using the above rules for generating meaningful element identifiers, a QueryID is generated, e.g., using a caption name and classname for the window. An MSAA name may be used in the event a caption name is not available.

In most situations, the simple QueryID described above works adequately. However, there are situations when the tester has to modify the QueryID to increase performance, work around bugs, and so forth. To demonstrate such situations, other examples are provided below.

More particularly, QueryElement attributes modify the effects of QueryElements by redirecting the source of the condition, state or identify a relationship between elements. These are often required, such as when the Name property came from (Windows, MSAA, UIA).

There are three general types of attributes [ ] which are currently supported by the record and playback framework as part of a QueryElement, namely type of search, navigational, and state.

Type of search—[Window] [MSAA] and [UIA].

The first Query Defaults to using the [Window] query mechanism, which is done for performance reasons. The remaining queries Default to [MSAA] in code generated for the MSAA Playback DLL, and defaults to [UIA] for the UIA playback DLL. Note that Win32 searches are typically faster, and even when searching an MSAA search, the Win32 tree may be searched first by default to find the window, after which the MSAA tree for that window is searched). The attribute [MSAA] can be used to specify that an MSAA search be used, e.g., . . . [MSAA] name='MenuBar', or . . . [Window] name='MenuBar'.

Navigational—[NextTo] and [ChildOf]

Navigation attributes are used to specify a relationship between controls:

| [ChildOf] |
| [NextTo] |

By default, each Query is the descendant of the previous query:

| Query # | ; Query 1 | ; Query 2 | ; Query 3 |
| To Target | ; great-ancestor | ; ancestor | ; target |

This behavior can be overridden by using the [NextTo] attribute. The example below shows how [NextTo] has modified the relationships between these elements:

| Query # | ; Query 1 ; | Query 2 | ; Query 3 |
| To Target ; | ancestor ; | previous found element ; | [NextTo]target |

Figure 6A:
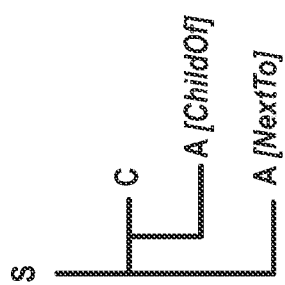
FIGS. 6A and 6B are representations of UI element hierarchies demonstrating relationship attributes and an instance flag used with query identifiers, respectively.
Figure 6B:
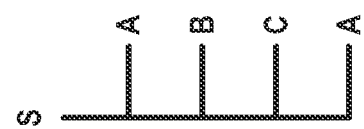

Thus, a navigational attribute specifies a relationship between elements in a QueryID. The [ChildOf] is default. By way of another example of navigational attributes, FIG. 6A shows a tree in which [NextTo.] and [ChildOf] may be specified to mean different elements. Thus, the uppermost element A is identifiable as ;S;C[ChildOf]A, (or simply ;S;C;A due to the default), whereas the other, lower element A is identifiable via ;S;C[NextTo]A. Note that in the example in FIG. 6B, there are two A elements but they are siblings on the same hierarchical path. In this example, the "Instance" identifier is used to distinguish the elements, e.g., the upper element A is identifiable via ;S;A&&Instance='1' while the lower element A is identifiable via ;S;A&&Instance='2'.

| State - [Selectable], [Selected], [Expanded], [Collapsed], [Checked], [Unchecked] and so forth. |

This attribute locates an element in a search, depending on the current state of the element. For example, FindAll [MSAA, Selected] Role='list item' will use an MSAA search to find all selected list items. Note that in this example, Attribute [FindAll] allows the tester to return a collection of UI elements that match QueryID. For instance, ;[FindAll, Expanded] Role='tree item' will get all expanded tree items, e.g.:

| [MSAA] Name = 'Common Controls' |
| [NextTo] Name = 'Button' |

Further, note from this example that QueryElements attributes may be combined as appropriate, e.g.:

| [MSAA, ChildOf, Selected] |
| [Window, NextTo]. |
| [MSAA,ChildOf] Name = 'Button' |

By default, the QueryId parser applies the following default templates to all QueryIDs. These defaults can be overrident with QueryElements attributes, e.g.:

| By Query | ;Query 1 | ; Query 2 | ; Query n |
| MSAA Playback | ;[Window] | ;[MSAA, ChildOf] | ;[MSAA, ChildOf] |
| UIA Playback | ;[Window] | ;[UIA, ChildOf] | ;[UIA, ChildOf] |

Some aspects of the QueryId technology are directed to performance, e.g., QueryIDs that contain a single query, on the average, take much longer to run that QueryIDs that have multiple queries in them. This is caused by the fact that single QueryID searches may need to look at every UI element in the application. In comparison, when multiple QIDs are used, each search is scoped to a relatively few elements in each control's parent window. This is a significant performance benefit.

Also for performance reasons, the record and playback framework will generate QueryIDs which have a Win32 Window (a UI element with associated HWND) searchable property as the first query of the QueryID. The reason for this is that the Win32 search is usually much faster than MSAA-based or UIAutomation-based searches, and subsequent searches can be restricted to children of this first query.

The following is an example using the sample QueryID above:

| ;Name = 'Untitled - Notepad' && ClassName = 'Notepad';Name = 'Application' && Role = 'menu bar';Name = 'File' && Role = 'menu item' |

Note that this is actually the same as the following (because of the defaults for each value):

| ;[Window]Name = 'Untitled - Notepad' && ClassName = 'Notepad';[MSAA, ChildOf]Name = 'Application' && Role = 'menu bar';[MSAA, ChildOf]Name = 'File' && Role = 'menu item' |

If a ControlId is used in a QueryElement, then the other parameters are ignored, as the ControlId is suppose to define a UI element uniquely, and a Win32 search is used. For instance the following QueryElement:

ControlId='1' && Name='OK' && Class='Button' is the same as

ControlId='1'

Turning to an example of controlling an application program such as Notepad, which changes its title bar text to the saved filename, from the above examples corresponding to FIGS. 4 and 5, the File Menu may identified with the following QueryID:

;Name='Untitled-Notepad' . . .

However, when saving the file to "temp.txt":

;Name='temp.txt-Notepad' . . .

The Name property is now different. Thus, a better solution is to request a partial match with the following QueryID:
;Name=>'-Notepad' && ClassName='Notepad'
A suitable final QueryID is set forth below:

---

;Name => ' - Notepad' && ClassName = 'Notepad';Name = 'Application' && Role = 'menu bar';Name = 'File' && Role = 'menu item'

---

To reiterate, the Symbol '=>' in a QueryID means a partial match, so the QueryID above can be read as "Name contains Notepad".

QueryId API Search Routines that Use QueryId

The following search routines are supported in the record and playback framework:
static ScreenElement FromQueryId(string queryId)—finds a ScreenElement starting from the root, expects full (exact) QueryId.
static ScreenElement FromQueryId(string queryId, string[ ] resourceKeys)—the same as the previous one, with globalization support.
ScreenElement FindByQueryId(string queryId))—finds a ScreenElement starting from this ScreenElement, expects full (exact) QueryId.
ScreenElement FindByQueryId(string queryId, string[ ] resourceKeys)—the same as the previous one, with globalization support.
static ScreenElement FromPartialQueryId(string queryId)—finds a ScreenElement starting from the root, allows partial QueryId.
static ScreenElement FromPartialQueryId(string queryId, string[ ] resourceKeys)—the same as the previous one, with globalization support.
ScreenElement FindByPartialQueryId(string queryId)—finds a ScreenElement starting from this ScreenElement, allows partial QueryId.
ScreenElement FindByPartialQueryId(string queryId, string[ ] resourceKeys)—the same as the previous one, with globalization support.
ScreenElement[ ] FindAllDescendants(string queryId) returns all descendants of this ScreenElement that match QueryId. The QueryId has to be a "single element" QueryId for this method.

Language Independent Search Routines

One difficulty with QueryIds that contain hard coded names is that these QueryIds are language dependent. To make tests language independent, overloads of search routines that support globalization can be used. These routines use resource keys to extract actual names dynamically, from binaries, LCX files or localization database. The syntax that is used is similar to the syntax of .NET String.Format function; each hard coded name is replaced with "{n}" and each search routine overload take string[ ] resourceKeys as the second parameter.

For instance, the following code is language dependent, because it has hard coded strings such as "Untitled", "Notepad" and "Format:

---

FromQueryId(":Name = 'Untitled - Notepad' && ClassName = 'Notepad':Name = 'Menu Bar' && ControlType = 'MenuBar':Name = 'Format' && ControlType = 'MenuItem'");

---

However, changing this code to the following makes it language independent, since actual names will be extracted dynamically (C# syntax):

---

FromQueryId (("":Name = '{0}{1}' && ClassName = 'Notepad':Name = 'Menu Bar' && ControlType = 'MenuBar':Name = '{2}' && ControlType = 'MenuItem'", new string[ ] {";Untitled;Win32String;notepad.exe;4", "; -Notepad;Win32String;notepad.exe;5",";F&ormat;NativeMenuString;notepad.exe;1;3" });

---

Note that resource keys are found and generated during the code generation phase in the record and playback framework or they can be found manually by using other tools.

Further, for QueryIds outside the record and playback framework, note that support for QueryIds may be implemented in a separate dll, so QueryIds can be used without using the record and playback framework. However, in this case, localization functionality should be defined by a tester.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having stored computer-executable instructions which when executed by a system implement a method for identifying a user interface element even when the element has been moved within the user interface from one node to another node of an interface hierarchy, the method comprising:
   determining a unique query element identifier for a target user interface element within a hierarchy of user interface elements;
   generating a partial query identifier for the target user interface element, the partial query identifier having the query element identifier therein and fewer than all ancestor query element identifiers, each ancestor query element identifier corresponding to a higher-level ancestor element relative to the target element in the hierarchy;
   using the partial query identifier to locate the target user interface element for testing a first version of the target application program by at least traversing the hierarchy in a search operation; and
   maintaining the partial query identifier to search for the target user interface element for testing a second version of the target application program to determine where the target user interface element has moved within the user interface, from one node to another node of the hierarchy associated with the interface, and as distinguished between the first and second versions of the target application program.

2. The computer-readable storage medium of claim 1 wherein determining the unique query element identifier comprises, selecting at least one identifier of a set, the set comprising Name, ClassName, Instance, AccessibleName, Role, ControlId and AutomationId.

3. The computer-readable storage medium of claim 2 wherein the unique query element is composed of at least two identifiers of the set, each identifier connected by a logical operator.

4. The computer-readable storage medium of claim 1 wherein the Partial query identifier includes at least one attribute.

5. The computer-readable storage medium of claim 4 wherein the at least one attribute corresponds to at least one attribute of a set of attributes, the set including, a type of search attribute, a navigational attribute and a state attribute.

6. The computer-readable storage medium of claim 5 wherein the type of search attribute corresponds to at least one type of search of a set, the set containing, Window, MSAA, and UIA.

7. The computer-readable storage medium of claim 5 wherein the navigational attribute corresponds to a relationship-related attribute of a set, the set containing parent, sibling, child, next to and the target element's position in a sequence.

8. The computer-readable storage medium of claim 5 wherein the state attribute corresponds to at least one state-related attribute of a set, the set containing, selectable, selected, expanded, collapsed, checked, and unchecked.

9. The computer-readable storage medium of claim 1 having further computer executable instructions, comprising, dynamically assigning a QueryElement delimiter on a per string basis, from a selected character in the string.

10. In a computing environment, a method for identifying a user interface element even when the element has been moved within the user interface from one node to another node of an interface hierarchy comprising:
    determining a unique query element identifier for a target user interface element within a hierarchy of user interface elements;
    generating a partial query identifier for the target user interface element to test within the hierarchy of user interface elements wherein generating the partial query identifier comprises including the query element identifier therein and fewer than all ancestor query element identifiers, each ancestor query element identifier corresponding to a higher-level ancestor element relative to the target element in the hierarchy;
    using the partial query identifier to locate the target element for testing a first version of the target application program by at least traversing the hierarchy in a search operation; and
    maintaining the partial query identifier to search for the target element for testing a second version of the target application program to determine where the target user interface element has moved within the user interface, from one node to another node of the hierarchy associated with the interface, and as distinguished between the first and second versions of the target application program.

11. The method of claim 10 wherein generating the unique query element identifier comprises, selecting at least one identifier of a set, the set comprising Name, ClassName, Instance, AccessibleName, Role, ControlId and AutomationId.

12. The method of claim 11 wherein the unique query element is composed of at least two identifiers of the set, each identifier connected by a logical operator.

13. The method of claim 10 wherein the partial query identifier includes at least one attribute.

14. The method of claim 10 further comprising, dynamically assigning a QueryElement delimiter on a per string basis, from a selected character in the string.

* * * * *